United States Patent Office 3,573,202
Patented Mar. 30, 1971

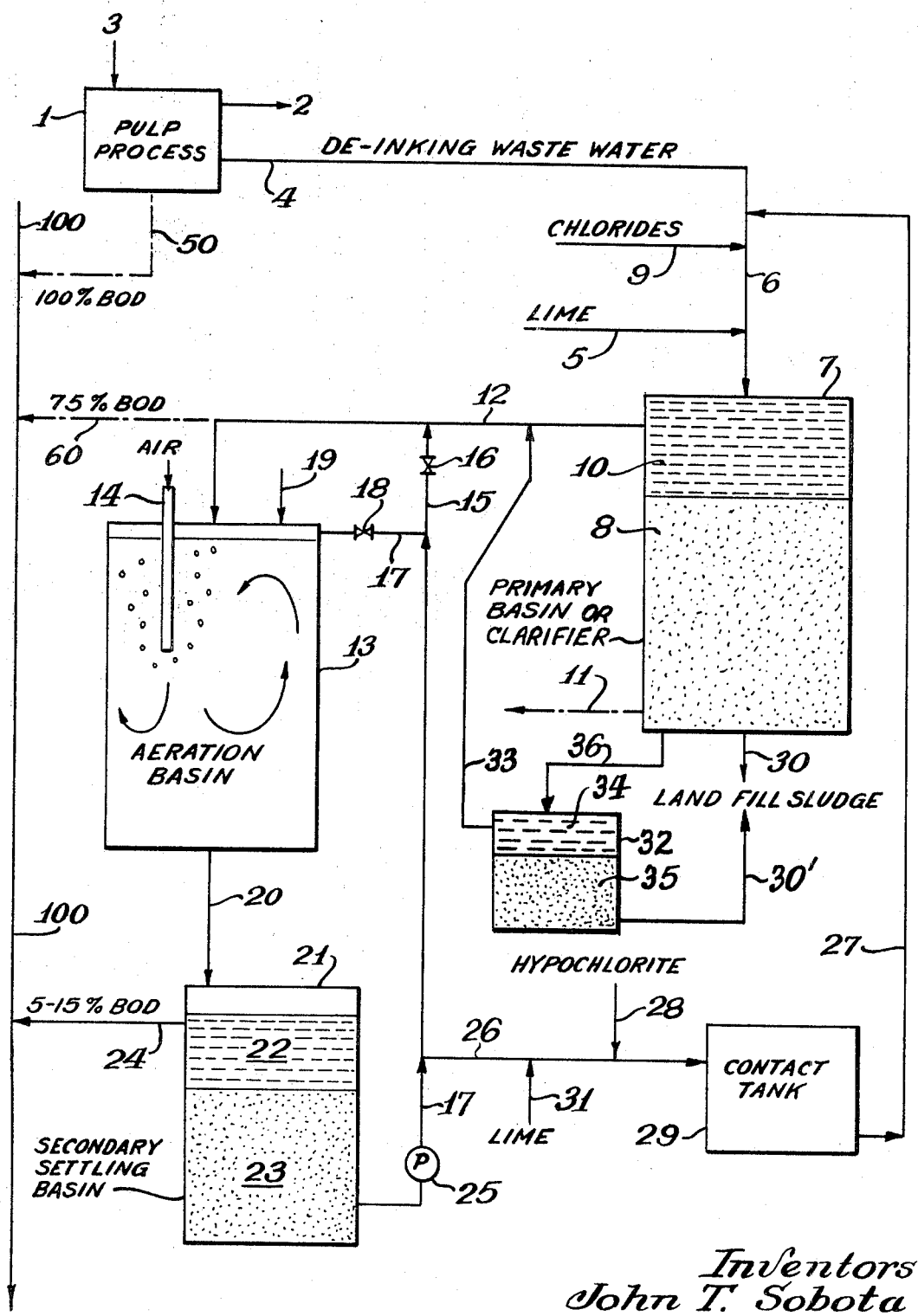

3,573,202
PROCESS FOR REDUCTION OF WATER POLLUTION DUE TO DOMESTIC AND INDUSTRIAL WASTES
John Thomas Sobota and David Frederick Pagel, Green Bay, Wis., assignors to Fort Howard Paper Company
Filed Mar. 5, 1970, Ser. No. 16,811
Int. Cl. C02c 1/08
U.S. Cl. 210—5      16 Claims

ABSTRACT OF THE DISCLOSURE

A process for reduction of water pollution due to domestic and industrial wastes, for example, waste from de-inked pulp making processes, comprising the treatment of such wastes in two main stages to produce a modified primary-secondary sludge which has a consistency of 20–25% solids, and is stable and odor free, as such useful for land fill. The sole liquid effluent is from the secondary stage which is 85%–95% free of pollutants, calculated as pounds of BOD of the initial de-inking wastes, thus resulting in a 7 to 20-fold decrease in pollutants.

---

This application relates to a process for treating waste effluent having a high BOD (biochemical oxygen demand) and is particularly useful for treatment of industrial wastes, such as those from pulp making processes commonly involved in the paper industry. The invention is particularly adapted to treating the waste effluent from de-inked pulp making processes.

An important source of pulp in the paper industry involves the preparation of pulp from secondary fibers, for example, waste paper. This is called de-inked pulp. However, this process involves complex chemical steps of removing ink, fillers, coatings, and non-cellulosics from the printed waste paper, with the consequent production of complex organic and inorganic chemical "de-inking wastes." Typically, such wastes include fibers, clays, starch, casein, pigment inorganics, ink organics, alkalies including $NaOH$, $Na_2CO_3$, and $NaHCO_3$, and detergents. These wastes are extremely fluid, being on the order of about .25% suspended solids, for example, 20 pounds of suspended solids per thousand gallons of waste water. In addition, the BOD of such wastes is high, on the order of 500–1200 p.p.m., which poses substantial loads for natural degradation systems. In contrast, domestic wastes have a BOD pollutant load on the order of about 200–400 p.p.m.

Too frequently, de-inking wastes have been discharged directly into natural waters without treatment. Currently common practice involves the application of primary treatment techniques to de-inking wastes. Typically, the wastes are piped directly to basins or clarifiers where the wastes settle as primary sludge, and the basin overflow is discharged directly into natural waters. Such primary treatment results in a 20%–30% reduction in the initial BOD load.

Research on further treatment using conventional secondary treatment methods has met with many difficulties. One of the principal difficulties is the production of secondary sludge which is malodorous and has a high water content, being only 1%–2% solids. As such, the secondary sludge cannot be disposed of as land fill. In addition, the secondary sludge is usually produced in the amount of about ½ pound of sludge, on a dry basis, for each pound of BOD removed by the secondary system. This is equivalent to about .4 lb. sludge per lb. BOD in the initial wastes. Thus, in a typical installation with an initial pollution load on the order of 12,000 pounds per day of BOD, about 2½ tons of secondary sludge would be produced in addition to the primary sludge.

Incineration is an alternative to land fill disposition of malodorous secondary sludge. However, the secondary sludge is a gelatinous, slimy mass having a solids content of only about 1%–2%, and is extremely difficult to de-water preparatory to incineration. Although the precise reason for the difficulty in de-watering is not known, it may be due to a complex hydrogen bonding or molecular cage effect associated with the gelatinous flock typical of such systems.

De-watering on vacuum filters is practiced, but it becomes very difficult here due to the gelatinous nature of the material and the abovenoted resistance to give up its water. Several processes have been described and designed to increase the filterability. Among these involve the use of various filter aids such as fibers, polyelectrolytes, diatomaceous earth and the use of ferric chloride and lime.

Another process for treatment of the secondary sludge involves digestion; while this is a partial solution for domestic wastes, industrial wastes are considered impractical to digest. Still other processes involve heat treatment in order to convert the secondary sludge to a condition for further thickening, as by filtration or centrifugation, prior to incineration. However, such heat treatments result in reversion of a large part of the sludge to a soluble state. Such a dissolving of the sludge can result in a recycling of from 25%–65% of the initial BOD load. This BOD recycle problem cannot be minimized since such processes necessitate greatly increased size and treatment plant cost.

Under optimum conditions, sludges above about 18% solids concentration are difficult to achieve for ordinary wastes. Secondary sludge from such processes is not suitable for land fill because of the odor problems, and incineration contributes to air pollution.

It is a principal object of this invention to reduce the water pollution occasioned by processing wastes;

It is another object of this invention to overcome the difficulties of the waste treatment processes set forth above;

It is another object of this invention to provide a relatively inexpensive and continuous process for production of a sludge from domestic and/or industrial wastes suitable for land fill, while avoiding BOD recycle problems;

It is still another object of this invention to provide a process for processing de-inking waste effluent to form a stable sludge having a consistency of 20%–25% solids and suitable as a substantially odor-free land fill;

It is another object to provide a secondary treatment process for industrial or domestic wastes involving steps of production of secondary sludge and its subsequent chemical treatment;

It is another object of this invention to provide a secondary treatment for wastes, such as de-inking wastes, which involves a recirculation and combination of a treated secondary sludge with primary sludge to provide a sludge end product which is stable, substantially odor free, has a solids consistency on the order of 20%–25%, and is suitable for land fill;

It is an object of this invention to provide a primary and secondary process for treating waste-containing water in which 85%–95% of the pollution, calculated as BOD, is removed;

It is an object of this invention to provide a method of treating de-inking waste water of high pollutant BOD content which method results in a 7 to 20-fold decrease in the pollutant content of the water;

Still further and other objects of this invention will be evident from the detailed description which follows.

In summary, our invention involves a modified primary and secondary treatment of wastes in a continuous, and relatively inexpensive process. The primary stage of the invention involves chemical treatment of the wastes, having a solids content on the order of 20 pounds suspended solids per thousand gallons, with lime, $Ca(OH)_2$, in a range of about 10–50 grains per gallon of waste water, followed by precipitation and floc formation in a primary retention basin or clarifier to form an initial primary sludge and a supernatant. As an alternative and preferred embodiment, this primry treatment may also include the addition of calcium or magnesium chloride or magnesium sulfate in the range of from about 3 to 30 grains per gallon of waste.

The supernatant from the primary retention basin is treated in a secondary activated sludge process which involves adding an activated sludge and aerating from 1 to 24 hours in a separate aeration basin. In this stage, solids on the order of ½ pound of sludge, on a dry basis, for each pound of BOD removed is generated.

The mixture from the aeration basin is passed to a secondary settling basin for from about 2–10 hours, where the mixture separates into a clear supernatant and a secondary sludge. This secondary sludge comprises a biological slime and is removed from the secondary settling basin at a concentration of 1%–2%. A portion of this secondary sludge is recycled to the aeration basin as the activated sludge for the incoming supernatant from the primary basin. The clear supernatant is on the order of 85%–95% free of the BOD coming into the aeration basin from the primary basin, and many be safely discharged to natural degradation sources.

The excess secondary sludge, over what is demanded for recycle to the aeration basin, is both malodorous and difficult to de-water. To overcome these problems and make the sludge suitable for disposal, we add to the slime 10%–40% calcium hypochlorite, $Ca(OCl)_2$, or the equivalent amount of sodium hypochlorite, with calcium hypochlorite being preferred. The slime-hypochlorite mixture may be passed into a contact tank for a period of time sufficient to exhaust most of the hypochlorite. Any hypochlorite not exhausted in the contact tank is easily exhausted in the primary basin and will not carry over into the aeration basin where it would kill the bacterial slime necessary for BOD reduction. A typical retention time range is from 1 to 6 hours. After the reaction of the hypochlorite with the slime, the resultant stabilized secondary sludge is recycled and mixed with the raw waste-containing water prior to its passage into the primary retention basin or clarifier.

The resultant mixture is treated with lime, passed into the primary basin where it forms a modified primary-secondary sludge. This sludge is stable, substantially odor free, and will concentrate to a consistancy of 20%–25% solids upon standing and periodic decantation, for a period of from about 1–6 weeks. The concentrated sludge may then be removed as used as substantially odor-free land fill.

The whole process operates in a temperature range of from 50–115° F. To insure adequate hypochlorite treatment, we prefer to keep that step at a temperature about 60° F., and more preferably within the range of from 80° F. to 120° F.

Further details of the invention are described below in detail with reference to de-inking pulp waste effluent, as illustrative but not restrictive of the application of our invention to wastes treatment.

The figure is a schematic flow sheet showing the overall process.

Referring now to the figure, a standard pulp process 1 for production of de-inked pulp 2 as from waste paper 3, uses water from a source, for example, paper machine waste water or fresh water, and produces de-inking waste water containing on the order of 20 pounds suspended solids per 1000 gallons waste, and also soluble wastes, the organic portion of which produces a BOD (biochemical oxygen demand) load on the receiving stream. The pollutant capacity of this waste is measured as an initial BOD, and a typical installation may produce on the order of 12,000 pounds BOD per day.

In the past, the de-inking wastes were often discharged directly into natural rivers or lakes without regard for pollution content, as via line 50, shown dashed to distinguish from our invention. According to our invention, the wastes are diverted to line 4, into which lime, $Ca(OH)_2$, is added from feed line 5 in the amount of from 10 to 50 grains per gallon of waste. In the alternative the lime is added from feed line 31, or both lines 5 to 31.

In one embodiment of our process, the treated waste is then passed via line 6 directly to a retention basin or clarifier 7, where a primary sludge precipitate or floc 8 forms and settles over a period of from 2 to 8 hours, typically, 3 hours.

For wastes lacking or deficient in magnesium sulfate, magnesium chloride, or calcium chloride, these components are added in an amount sufficient to form a floc, from feed line 9 to the waste in line 6. Typically this is an amount ranging from about 3 to 30 grains per gallon of wastes. We have found that the addition of calcium chloride, magnesium chloride or magnesium sulfate is far more effective in promoting flocculation and consequent supernatant clarity than equivalent increase of lime. A portion of the total chloride content in basin 7 will be contributed from recycled stabilized sludge from line 27. This portion of the chloride originates from the conversion of the hypochlorite in the contact tank 29 to corresponding chloride.

Returning now to retention basin 7, prior to establishment of steady state conditions therein due to recycle from line 27, the treated waste from line 6 flocculates and initially settles into a lower primary sludge layer 8 and an upper primary supernatant 10. In other prior processes, the supernatant was then discharged via line 60 (shown dashed) in natural streams or lakes without regard to the BOD pollution content. In such prior processes, no further treatment was involved and typically 20%–30% of the initial BOD was removed, leaving an average 75% of the BOD load to discharge to stream 100. Likewise, primary sludge 8 without further treatment was collected, as via line 11 (also dashed for distinction) for disposal as land fill. Although primary sludge does not have the difficulties with de-watering and odor characteristic of secondary sludge, primary treatment alone will not remove an amount of BOD beyond about 20–30%.

By contrast, in the process of this invention the primary supernatant 10, by overflow or pumping, is passed via line 12 to aeration basin 13, equipped with conventional diffuser or mechanical aeration. There the supernatant is agitated by mechanical means (not shown) or by air let in via line 14. In addition, activated sludge is added to the line 12 from line 15, upon opening valve 16. The activated sludge may also be added directly to the basin from line 17 upon opening of valve 18. While the initial seeding of this step of the process is usually natural, it may be done via line 19 from an independent supply of bacterial solids. After residence in the aeration basin 13 for from 1–24 hours, preferably 4–6 hours, the process mixture is passed via line 20 to secondary settling basin 21. There the mixture separates into a clear supernatant 22 and secondary sludge 23 in a period of from about 2–10 hours, preferably about 3 hours.

The clear supernatant in basin 21 is on the order of 85%–95% free of the incoming BOD, as compared to the value in line 12, and may be safely discharged via line 24 to natural water source 100. For example in a plant producing 12,000 pounds per day BOD pollutant in line 4, the supernatant in line 12 would be reduced to 9,000 pounds, and the effluent from line 24 would contain on the order of only about 900 pounds per day. This is about a 13-fold reduction in the initial pollution level.

The aeration and settling steps in basins 13 and 21 produce an activated sludge, part of which is recycled via pump 25 and lines 15 or 17 to the aeration basin 13. The activated sludge in excess of that needed for the aeration basin recycle is passed through line 26 to contact tank 29. The excess sludge produced amounts to on the order of ½ pound per pound of BOD in line 12, and is a bacterial slime of 1%–2% solids content. This slime is further processed in tank 29 by the addition through line 28 of a hypochlorite, for example calcium hypochlorite, in the amount of about 10%–40% based on the dry solids content of the slime. Alternatively an equivalent amount of sodium hypochlorite may be used, but calcium hypochlorite, $Ca(OCl)_2$, is preferred. The mixture is retained in tank 29 for from 1 to 6 hours, preferably 4 hours, at a temperature above 60° F., preferably 80° F. to 120° F., until a stabilized sludge is produced.

While the action of the hypochlorite is not entirely clear, and we do not wish to be bound by theory, it appears that it reacts with the odor-forming components of the aerobic bacterial metabolic products converting them to non-odor forming components, or fixes organic and inorganic precursors, particularly sulfur and sulfides, prior to entering the bacterial metabolic conversion to malodorous compounds.

Subsequent to the production of the stabilized sludge in contact tank 29, this sludge is recycled via line 27 back to the input line 6, for example at the rate of 20–40 gal./min. for the initial wastes flow containing 12,000 lbs. BOD per day in line 4. Prior to passage into the primary basin 7, lime, and alternatively calcium chloride, magnesium chloride, or magnesium sulfate, are mixed into the waste water-stabilized sludge mixture. The entire mixture passes into the primary basin where, in the steady state condition it forms a modified primary-secondary sludge.

The modified primary-secondary sludge mixture settles and gradually fills the basin. At this time line 6 is diverted to a second primary basin, not shown. The original basin 7 is let stand and the supernatant is periodically decanted through line 12, until the sludge layer 8 has reached a consistency of 20%–25% solids, within a period of from about 1–6 weeks. The concentrated sludge is removed, for example by dredging, shown schematically as removal via line 30. The removed modified sludge mixture is a substantially odor-free sludge of 20%–25% solids, suitable as such for hauling and depositing as land fill.

It should be understood that the secondary sludge conditioning phase of our process, i.e., the stage involving treatment by hypochlorite, is an oxidation process carried out under alkaline conditions wherein there is a large alkaline reserve, as distinguished from direct chlorination processes. It is important to note that our process does not cause reversion of the secondary sludge to a soluble state, and thus there is no recycling of the BOD load due to such dissolution.

By our invention, the costly and difficult processes of de-watering a secondary sludge are obviated, yet a relatively high solids content, substantially odor-free land fill is obtained. We have found that treatment by lime alone is insufficient to reduce the odor to an acceptable level, while the combination with hypochlorite produces effective odor control even at low lime levels. It is also preferred that the floc forming in primary basin 7 is a coprecipitate of recycle sludge from line 27 with the raw wastes. Alternately, the lime may also be added to tank 29 via line 31.

While the specific example of our invention has been shown using a primary basin in which the settling and thickening of the modified primary-secondary sludge takes place, for example an earthen lagoon, it should be understood that a clarifier of conventional construction may be used. In this alternate embodiment, sludge on the order of 2–6% solids concentration may be withdrawn from the clarifier via line 36 and discharged into a separate thickening basin 32 operating continuously with the clear supernatant overflowing via line 33 into line 12.

When the thickening basin is full as indicated by loss of suspended solids removal efficiency, the sludge flow incoming from the clarifier is diverted to another thickening basin (not shown). The discontinued basin is let stand and the supernatant 34 is periodically decanted via line 33 to line 12 until the sludge 35 has reached a consistency of 20–25%, usually within a period of from about 1–6 weeks. Sludge 35 is removed as before, shown schematically via line 30', as substantially odor-free land fill.

While the above description has been limited for the purpose of conciseness to the examples discussed, it should be appreciated that variations within the skill of the art may be made in our process without departing from the spirit thereof.

We claim:

1. A method for reducing water pollution due to domestic or industrial waste-containing water having an initial BOD pollutant load in the range of from about 200–1200 p.p.m., comprising in combination the steps of:
    (a) adding lime and a stabilized secondary sludge to said wastes to form an aqueous mixture,
    (b) maintaining said mixture in a first primary retention basin for a period of time sufficient to separate said mixture into a primary supernatant having a reduced BOD load, and a stable primary-secondary sludge mixture having a solids content on the order of from about 2–25%,
    (c) withdrawing said primary supernatant into an aeration basin,
    (d) aerating said primary supernatant to form an activated sludge mixture,
    (e) withdrawing said activated sludge mixture to a secondary basin,
    (f) maintaining said activated sludge mixture in said secondary basin for a period of time sufficient to separate said mixture into (1) a clear supernatant, and (2) a secondary sludge comprising bacterial slime having on the order of 1–2% solids content,
    (g) discharging said clear supernatant from said secondary basin,
    (h) withdrawing a first portion of said secondary sludge from said secondary basin and recycling it to said aeration basin,
    (i) withdrawing a second portion of said secondary sludge from said secondary basin, and
    (j) adding a hypochlorite to said second sludge portion to form a stabilized secondary sludge, whereby said clear supernatant has a BOD load of from 85–95% below said primary supernatant BOD load.

2. The process in claim 1 wherein:
    (a) said lime is added in an amount of from about 10 to 50 grains, calculated as $Ca(OH)_2$, per gallon of said waste water, and
    (b) said hypochlorite is selected from the group consisting of sodium and calcium hypochlorite, and mixtures thereof.

3. The process of claim 2 wherein:
    (a) said hypochlorite is added in an amount ranging from about 10–40% by weight based on the dry activated sludge content.

4. The process as in claim 1 which includes the added step of:
    (a) adding to said wastes a compound selected from the group consisting of calcium chloride, magnesium chloride, magnesium sulfate, and mixtures thereof in an amount in the range of from about 3 to 30 grains per gallon of said waste water.

5. A method as in claim 1 wherein said stabilized secondary sludge produced in step (j) is recycled to said wastes in step (a).

6. A method as in claim 1 wherein:
(a) said primary basin is an earthen lagoon, and which method includes the added steps of:
(b) diverting said aqueous mixture to another primary basin when said first primary basin is full,
(c) periodically decanting said first primary basin of said primary supernatant, and
(d) removing said stable primary-secondary sludge as a substantially odor-free land fill when the solids content is on the order of from about 20-25%.

7. A method as in claim 6 wherein:
said decanting takes place over a period of from about 1–6 weeks.

8. A method as in claim 1 wherein:
said lime is added to said second portion of said secondary sludge.

9. A method as in claim 1 wherein:
said waste water is from a domestic source.

10. A method as in claim 1 wherein:
said waste water is from an industrial source.

11. A method as in claim 1 wherein:
said waste water is a de-inked pulp process waste water.

12. A method as in claim 2 wherein:
said waste water is a de-inked pulp process waste water.

13. A method as in claim 1 wherein:
said step (j) includes maintaining said hypochlorite-second sludge portion mixture at a temperature of about 65° F.

14. A method as in claim 13 wherein:
said temperature is maintained in the range of from 80° F. to 120° F.

15. A method as in claim 1 wherein:
(a) said primary basin is a clarifier, and which method includes the added steps of:
(b) continuously withdrawing said stable primary-secondary sludge mixture from said clarifier at a solids content in the range of from about 2-6%,
(c) passing said withdrawn sludge into a thickening basin wherein said mixture continuously separates into a supernatant and a sludge,
(d) passing said continuously formed supernatant to an aeration basin,
(e) stopping flow to said thickening basin when the basin is substantially full,
(f) then periodically decanting said thickening basin of supernatant which forms thereon and passing said supernatant to an aeration basin, and
(g) withdrawing said sludge as a stable primary-secondary sludge suitable for substantially odor-free land fill when the solids content is on the order of from about 20-25%.

16. A method as in claim 15 wherein:
said decanting takes place over a period of from about 1–6 weeks.

References Cited
UNITED STATES PATENTS

| | | | |
|---|---|---|---|
| 1,999,973 | 4/1935 | Genter | 210—6 |
| 3,220,945 | 11/1965 | Torpey | 210—6X |
| 3,386,911 | 6/1968 | Albertson | 210—6X |
| 3,423,309 | 1/1969 | Albertson | 210—5 |
| 3,440,165 | 4/1969 | Davis et al. | 210—18X |
| 3,485,750 | 12/1969 | Albertson | 210—8 |

OTHER REFERENCES

Keefer, C. E., Sewage Treatment Works, first edit., 1940, McGraw-Hill, New York, pp. 308, 329–332, 342–344, 463 and 464 relied on.

MICHAEL ROGERS, Primary Examiner

U.S. Cl. X.R.
210—6, 10, 62